ERROR DETECTION BY REDUNDANCY CHECKS

Filed March 8, 1965 3 Sheets-Sheet 1

| INFORMATION BITS | | | | CHECK BITS | |
|---|---|---|---|---|---|
| W | X | Y | Z | A | B |
| 0 | 0 | 0 | 0 | 1 | 0 |
| 1 | 0 | 0 | 0 | 0 | 0 |
| 0 | 1 | 0 | 0 | 0 | 0 |
| 1 | 1 | 0 | 0 | 0 | 1 |
| 0 | 0 | 1 | 0 | 0 | 0 |
| 1 | 0 | 1 | 0 | 0 | 1 |
| 0 | 1 | 1 | 0 | 0 | 1 |
| 1 | 1 | 1 | 0 | 1 | 1 |
| 0 | 0 | 0 | 1 | 0 | 0 |
| 1 | 0 | 0 | 1 | 0 | 1 |
| 0 | 1 | 0 | 1 | 0 | 1 |
| 1 | 1 | 0 | 1 | 1 | 1 |
| 0 | 0 | 1 | 1 | 0 | 1 |
| 1 | 0 | 1 | 1 | 1 | 1 |
| 0 | 1 | 1 | 1 | 1 | 1 |
| 1 | 1 | 1 | 1 | 1 | 0 |

FIG. 1.

INVENTOR.
GEORGE T. SHIMABUKURO
BY Christie, Parker & Hale
ATTORNEYS.

INVENTOR.
GEORGE T. SHIMABUKURO
BY
Christie, Parker & Hale
ATTORNEYS.

TABLE 1

| NUMBER OF "1's" | A | B |
|---|---|---|
| 0 | 1 | 0 |
| 1 | 0 | 0 |
| 2 | 0 | 1 |
| 3 | 1 | 1 |
| 4 | 1 | 0 |

TABLE 2

| NUMBER OF "1's" | A | B |
|---|---|---|
| 0 | 1 | 1 |
| 1 | 1 | 0 |
| 2 | 0 | 1 |
| 3 | 0 | 0 |
| 4 | 1 | 1 |

FIG. 3.

INVENTOR.
GEORGE T. SHIMABUKURO
BY Christie, Parker & Hale
ATTORNEYS.

United States Patent Office 3,458,860

Patented July 29, 1969

3,458,860

ERROR DETECTION BY REDUNDANCY CHECKS

George T. Shimabukuro, Monterey Park, Calif., assignor to Burroughs Corporation, Detroit, Mich., a corporation of Michigan Filed Mar. 8, 1965, Ser. No. 437,945
Int. Cl. G06f 11/10
U.S. Cl. 340—146.1 10 Claims

ABSTRACT OF THE DISCLOSURE

An error detection system which utilizes check bits which are added to each information character of a block of information to be transmitted and which detects more error conditions than does the simple parity system. The check bits are chosen so that they not only indicate the number of binary "1's" in a transmitted information character, but make the number of binary "1's" in the total character uniformly odd or even. The relationship between the number of check bits which must be added to each information character is determined by $k \geqq \log_2(n)$ where $n$ is the number of bits in the information character and $k$ is the number of check bits required for that size character. Logic circuitry, responsible to the number of "1's" in each information character, adds the requisite check bits to each information character prior to the transmission of the total character. Additional logic circuitry determines the number of "1's" in the transmitted information character and error detection circuitry compares this number with the number indicated by the transmitted check bits.

This invention relates to the transmission of information in digital form and, and more particularly, to a method of detecting errors in such transmission by means of redundancy checks and apparatus for implementing the method.

When binary digital information is transmitted between widely separated transmitting and receiving units, it is not uncommon for errors to appear in the transmitted information. Such errors can arise as a result of a number of factors such as, for example, the length of transmission, atmospheric conditions, or the condition of the transmission line.

Error detecting schemes in which redundant information is transmitted along with transmitted information values in order to detect errors are well-known in the art. Several such schemes are disclosed in Richards, Arithmetic Operations in Digital Computers, D. Van Nostrand Co., Inc. 1955, at pp. 187 ff. The most well-known form of error detection uses a single redundant bit, or check bit, designated a "parity bit," which is added to each transmitted character. The parity bit added to each character is used to indicate whether the number of "1's" in the transmitted character is odd or even. This method will detect any single error in transmission of a character since a single error will change the number of "1's" from odd to even or vice versa. This method will not detect any double errors in transmission of a character, however, since double errors will always cause the number of "1's" to remain either odd or even.

Another method of error detection which has heretofore been used only on blocks of transmitted information is the bit count method. By this method, a block of information is transmitted, the number of "1's" in the block is counted, and this number is transmitted subsequent to the transmission of the block. By counting the "1's" as they are received and comparing this number against the count transmitted subsequent to the block, it is possible to determine whether there has been an error or not.

The present invention represents an improved method of error detection by means of the addition of redundant bits to each transmitted character and means for implementing this method.

An advantage of the present invention is that it detects more error conditions than does the simple parity system.

Another advantage of the present invention is that it indicates which character is in error.

Another advantage of the present invention is that it is easily implemented.

The preceding and other advantages of the present system are achieved by means of check bits added to characters to be transmitted. The check bits are chosen so that they indicate both the number of "1's" in a transmitted character and whether the number of "1's" is in the character is odd or even. It has been found that the relationship between the number of check bits which must be added to each character and the number of information bits per character is determined by $$k \geqq \log_2(n)$$

Where $n$ is the number of bits in the information character and $k$ is the number of check bits required for that size character. Thus, if the information characters contain four bits, the total character with check bits contains six bits and if the information characters contain six bits, the total character with check bits contains nine bits.

The error detection scheme of the present invention will detect all single transmission errors in a character detectable by a simple parity system because the check bits indicate whether the number of "1's" in the character is odd or even.

Additionally, the error detection scheme of the present invention will detect most double errors occurring in the transmission of a single information character. None of these errors would be detected by a simple parity system since double errors would not change the number of "1's" in the character from an even to an odd value or vice versa. Only those double errors will be detected which result from two "1's" being received as "0's" or from two "0's" being received as "1's." These situations will include most double errors, however, since errors occurring twice during the transmission of a single information character will ordinarily result from a common cause and be of the same type. The errors need not be in adjacent bits of the character, but may occur anywhere within the information character. The error detection scheme of the present invention, however, will not detect double errors resulting from one "1" being received as a "0" and one "0" being received as a "1." In such a situation the number of "1's" remains the same and also remains either odd or even. Consequently, such errors will not be detected.

Furthermore, the present invention will detect triple errors in the transmission of a single information character in situations where such error detection is significant. The ordinary parity system will of course detect such triple errors since they will necessarily change the number of "1's" from an odd to an even value, or vice versa, but such detection is of little consequence when no double errors are detectable. In the present invention, however, the majority of double errors are detected and the detection of triple errors is thereby rendered significant.

Additionally, the present invention may be adapted to detect all triple errors occurring in the transmission of a total character, including both an information character and its check bits. This adaptation, however, will not detect all double errors resulting from two "1's" being received as "0's" or from two "0's" being received as "1's" when one of these errors occurs in a check bit rather than in a bit of the information character.

Alternatively, the present invention may be adapted to detect all double errors in the total character resulting from two "1's" being received as "0's" or from two "0's"

being received as "1's" regardless of whether these errors occur in the bits of the information character or in the check bits. This adaptation, however, will not detect all triple errors occurring in the transmission of a total character when one of these errors occurs in a check bit rather than in a bit of the information character.

The manner of operation of the present invention and the manner in which it achieves the above and other advantages may be more clearly understood by reference to the following detailed description when considered with the drawing, in which:

FIG. 1 depicts a table showing values assigned to two check bits for an exemplary application of the present invention to the transmission of information characters containing four bits;

FIG. 3 depicts a table showing alternative values assigned to two check bits for exemplary applications of the present invention to the transmission of information characters containing four bits.

Figure 2:
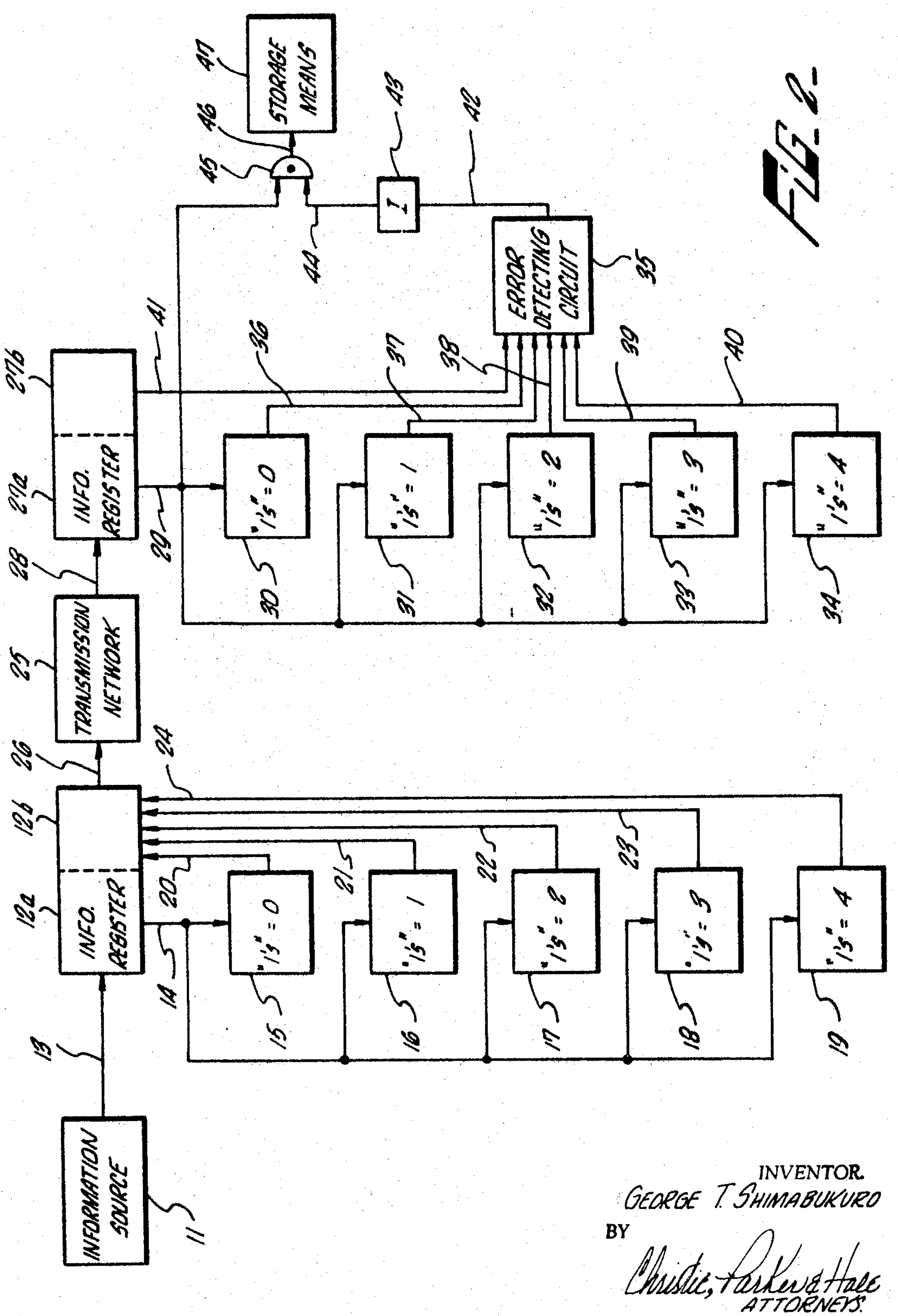
FIG. 2 depicts a preferred embodiment of the present invention adapted to the transmission of information characters containing four bits.

As stated previously, the present invention achieves the detection of transmission errors in information characters by means of the addition of check bits to these characters. The relation between the number of check bits added to each information character and the number of information bits in the character is governed by the relationship $$k \geq \log_2(n)$$

where $n$ is the number of bits in the information character and $k$ is the number of check bits required to be added to that size character. Although the present invention is not limited to transmission of information characters of any particular size, for the sake of clarity it will be described hereinafter in terms of its application to the transmission of information characters each of which has four bits. It may be seen from the formula above that when $n$ equals "4", $k$ must be equal to or greater than "2."

FIG. 1 depicts a table showing values assigned to two check bits designated A and B, respectively, for an exemplary application of the present invention to the transmission of information characters containing four bits designated W, X, Y, and Z, respectively. When information characters having four bits are utilized, sixteen different combinations of characters are possible. These sixteen combinations are shown in FIG. 1 and exemplary values for check bits A and B are shown adjacent the sixteen combinations. The values assigned to the check bits, as shown in FIG. 1, denote the number "1's" in each combination of information bits. They have also been chosen so that the total number of "1's" in each total bit comprising an information character and its associated check bits will be an odd number.

The values of A and B were chosen according to the following relationship:

(1) where the information character has no "1's," A is set equal to "1" and B is reset equal to "0";

(2) where the information character has only one "1," A and B are both reset to "0";

(3) where the information character has two "1's," A is reset to "0" and B is set to "1"; and (4) where the information character has three "1's," A and B are both set to "1."

It is apparent that there are four combinations of values which may be assigned to A and B, but that there are five possible combinations of information characters having different numbers of "1's" therein. Thus, in FIG. 1 the particular information character having four " 1's" is shown to have assigned therewith check bits wherein A is set to "1" and B is reset to "0." This is the same value of check bits previously assigned to the information character having no "1's." Although it would be possible to use only fifteen of the sixteen combinations of information characters, thereby avoiding use of a single combination of check bits to represent information characters having different numbers of "1's" therein, it will be seen that this double use of these check bits is not disadvantageous.

Although particular values of check bits are shown associated with the various combinations of information bits in FIG. 1, these particular choices of check bits are only exemplary of one particular combination of check bits which may be used when information characters having four bits are to be transmitted.

FIG. 2 depicts a preferred embodiment of the present information adapted to the transmission of information characters containing four bits. Information source 11 is shown connected to information register 12 by lead 13. An output signal from register 12 is applied via lead 14 to diode gating circuitry 15, 16, 17, 18, and 19. Register 12 is shown to have two portions **12*a* and 12*b*. The previously mentioned lead 14 transmits output signals from section 12*a* of the register to the gating circuitry 15–19 while outputs from these gating circuits are transmitted to section 12*b* via leads 20, 21, 22, 23, and 24, respectively. The contents of register 12 are transmitted to transmission network 25 by means of lead 26 and from transmission network 25 to information register 27 by means of lead 28. Register 27, like register 12, has two portions 27*a* and 27*b*. An output signal from section 27*a* is transmitted via lead 29 to gating circuitry 30, 31, 32, 33, and 34. Output signals from these gating circuits and an output signal from section 27*b* of register 27 are transmitted to error detecting circuit 35 via leads 36, 37, 38, 39, 40, and 41, respectively. An output signal from error detecting circuit 35 is transmitted via lead 42 to inverter 43 and thereafter via lead 44 to gate 45. An output signal from section 27*a* of register 27 is also transmitted to gate 45 via lead 29. Upon the application of simulaneous signals to gate 45 via leads 44 and 29, a signal is passed by way of lead 46 to storage means 47**.

The construction and operation of the circuitry disclosed in FIG. 2 will now be described. Information source 11 shown in block diagram form may represent any well-known circuitry capable of sequentially transmitting information characters to register 12. Information register 12 may advantageously comprise a number of flip-flop circuits. Section **12*a* will comprise four flip-flop circuits for the storage of the information bits W, X, Y, and Z, shown in FIG. 1. The particular values stored in these flip-flop circuits will be transmitted to the gating circuits 15–19. Output signals from these gating circuits are transmitted to section 12*b* of register 12**. This section may comprise two flip-flop circuits for storage of the check bits A and B shown in FIG. 1.

Transmission network 25, shown in block diagram form, may comprise any well-known means for transmitting signals between a sending unit and a receiving unit. Information register 27 may be identical to register 12 and stores each total character comprising both information bits and check bits transmitted via network 25. Signals indicative of the information stored in section **27*a* of register 27 are transmitted to gating circuits 30–34 and outputs of these circuits along with a signal indicative of the information stored in section 27*b* are transmitted to error detecting circuit 35. Circuits 15–19 and 30–35** are shown in block diagram form and may comprise well-known diode gating circuitry designed to perform particular logical operations, as described hereinafter.

Inverter 43 represents a well-known logical element which will transmit a signal to gate 45 when no signal is presented to it on lead 42, but will not transmit a signal when a signal is presented to it on lead 42.

Storage means 47, also shown in block diagram form, may represent any well-known means such as, for example, flip-flop circuits or magnetic memory circuits for the storage of correctly transmitted information.

Gating circuits 15 and 30 are designed to transmit signals only when the information bits stored in flip-flops W, X, Y, and Z of registers 12 and 27 contain no "1's." Similarly, circuits 16 and 31 are designed to transmit signals when these flip-flops contain one "1," circuits 17 and 32 are designed to transmit signals when these flip-flops contain two "1's," circuits 18 and 33 are designed to transmit signals when these flip-flops contain three "1's," and circuits 19 and 34 are designed to transmit signals when these flip-flops contain four "1's." The operation of these circuits may be described algebraically, as shown below where $T_0$ indicates an output from circuit 15 or 30, $T_1$ indicates an output from circuit 16 or 31, $T_2$ indicates an output from circuit 17 or 32, $T_3$ represents an output from circuit 18 or 33, and $T_4$ represents outputs from circuit 19 or 34, and where W, X, Y, and Z represent "1's" stored in these flip-flops and $\overline{W}$, $\overline{X}$, $\overline{Y}$, and $\overline{Z}$ represent "0's" stored in these respective flip-flops:

$$T_0=\overline{W}\overline{X}\overline{Y}\overline{Z}$$
$$T_1=W\overline{X}\overline{Y}\overline{Z}+\overline{W}X\overline{Y}\overline{Z}+\overline{W}\overline{X}Y\overline{Z}+\overline{W}\overline{X}\overline{Y}Z$$
$$T_2=\overline{W}\overline{X}YZ+\overline{W}X\overline{Y}Z+\overline{W}XY\overline{Z}+W\overline{X}\overline{Y}Z+W\overline{X}Y\overline{Z}+WX\overline{Y}\overline{Z}$$
$$T_3=\overline{W}XYZ+W\overline{X}YZ+WX\overline{Y}Z+WXY\overline{Z}$$
$$T_4=WXYZ$$

The output signals on leads 20–24 may be utilized to set the flip-flops A and B of section 12$b$ to the conditions shown in FIG. 1 for respective values stored in the flip-flops W, X, Y, and Z. Thus, a "1" will be stored in flip-flop A when the number of "1's" in flip-flops W, X, Y, and Z is zero, three, or four, and a zero will be stored in flip-flop A when the number of "1's" in the flip-flops W, X, Y, and Z is one or two. Similarly, a "1" will be stored in flip-flop B when the number of "1's" stored in the flip-flops W, X, Y, and Z is two or three and a "0" will be stored in flip-flop B when the number of "1's" stored in flip-flops W, X, Y, and Z is zero, one, or four.

If the storage of a "1" in flip-flops A and B is considered to be a setting operation and the storage of a "0" is considered to be a resetting operation, then the values stored in flip-flops A and B in accordance with FIG. 1 and as just described may be represented by the following equations:

$$\text{Set A}=T_0+T_3+T_4$$
$$\text{Reset A}=T_1+T_2$$
$$\text{Set B}=T_2+T_3$$
$$\text{Reset B}=T_0+T_1+T_4$$

Upon transmission of a total character to register 27, gating circuits 30–34 will indicate the number of "1's" stored in flip-flops W, X, Y, and Z of register 27 and a signal on lead 41 will indicate the values stored in flip-flops A and B of section 20$b$ of register 27. These signals indicative of the number of "1's" in flip-flops W, X, Y, and Z and the values stored in A and B are transmitted to error detecting circuit 35. This circuit is also a diode gating circuit designed to perform a particular logical operation.

If no error is detected in the total character stored in register 27, a signal will not be transmitted from circuit 35 to lead 42 and consequently a signal will be applied to lead 44 from inverter 43 and the information character stored in section 27$a$ of register 27 will be transmitted by gate 45 and stored in the storage means 47. If, however, error detecting circuit 35 does detect an error in the total character stored in register 27, it will transmit a signal to lead 42 and as a result no signal will appear on lead 44 and gate 45 will prevent the information stored in section 27$a$ of register 27 from being stored in the storage means 47.

A detecting circuit 35 will transmit an error signal $Te$ if it determines that flip-flop A has a "1" stored therein, when the signals from circuits 30–34 indicate that a "0" should be stored therein, when flip-flop A has a "0" stored therein and signals from these circuits indicate that a "1" should be stored therein, when flip-flop B has a "1" stored therein while signals from these circuits indicate that a "0" should be stored therein, or when flip-flop B has a "0" stored therein while signals from these circuits indicate that a "1" should be stored therein. The logical operation performed by this circuit is shown by the following equation:

$$Te=A(T_1+T_2)+\overline{A}(T_0+T_3+T_4)+B(T_0+T_1+T_4)+\overline{B}(T_2+T_3)$$

where A and B represent "1's" stored in these flip-flop circuits and $\overline{A}$ and $\overline{B}$ represent "0's" stored therein.

It is seen by examining FIG. 1 that the total number of "1's" in any total character remains odd regardless of the number of "1's" in any information character. Thus, the present invention may detect any error also detectable by the well-known parity method of error detection. Furthermore, since the check bits A and B also manifest the total number of "1's" in an information character, any transmission error wherein the number of "1's" in the information is changed will also be detected by the present invention. This will come about when two "1's" stored in section 12$a$ of information register 12 are transmitted as "0's" to information register 27 or when two "0's" stored in section 12$a$ of register 12 are transmitted to register 27 as "1's." In either case, the error will be detected since the number of "1's" stored in the flip-flops W, X, Y, and Z of section 27$a$ of register 27 will be different from the proper number as indicated by the values stored in flip-flops A and B of section 27$b$. Thus, for example, if the information character 0010 and its associated check bits 00 are transmitted from register 12 but are received in register 27 as the information character 1110 and check bits 00, an ordinary parity system would not detect this error since an odd number of "1's" were both transmitted and received. However, using the present invention, the check bits 00 indicate that the number of "1's" in the information character should be "one" rather than "three" and this transmission error will therefore be detected and the erroneous information character will not be stored in storage means 47.

It is apparent, however, that not all double errors in the transmission of an information character will be detected. Thus, if at the same time a "1" stored in section 12$a$ of register 12 is received by register 27 as a "0" and at the same time a "0" stored in section 12$a$ is received by register 27 as a "1," both the parity and number of "1's" in the erroneously transmitted character will be equal to those of the correct character. Consequently, this error will not be detected.

The present invention will, however, detect most double errors in the transmission of these information characters since errors occurring twice during the transmission of the single character will ordinarily result from a common cause and be of the same type, i.e., two "1's" transmitted as "0's" or two "0's" transmitted as "1's." The errors need not be in adjacent bits of the character but may occur anywhere within the information character and will nevertheless be detected.

It may also be seen that the use of a "1" stored in flip-flop A and a "0" stored in flip-flop B to represent both the condition of "No. 1's" in the information character and the condition of "Four 1's" in the information character need not cause any problem. Thus, four errors would have to occur in the transmission of one of these information characters before the check bits transmitted therewith would fail to indicate the occurrence of an error.

Additionally, the values stored in flip-flops A and B in accordance with the pattern shown in FIG. 1 will be effective to detect triple errors occurring in the transmission of a total bit. Since each total bit, as shown in FIG. 1, comprising the information bits and check bits, contains an odd number of "1's," any three transmission errors, no matter whether they occur in the information bits or in the check bits, will produce a total character having an even number of "1's." This parity change will, of course, be detected by the present invention and will indicate the occurrence of transmission errors. Although the ordinary parity system would also detect such triple errors, their detection by an ordinary parity system is of little significance since such a system will detect no double errors. Since the present invention will detect most double transmission errors, the detection in addition of all triple errors becomes significant.

The adaptation of the present invention utilizing the check bits as shown in FIG. 1 while detecting all double errors of the type previously discussed which occur in the information bits W, X, Y, and Z will not detect all such errors when one of them occurs in a transmitted check bit rather than in a transmitted information bit.

FIG. 3 shows two tables, the first of which shows the values stored in flip-flops A and B for the various numbers of "1's" stored in flip-flops W, X, Y, and Z in accordance with the improved parity embodiment of the present invention as shown in FIG. 1. It may be seen from studying this table that if, for example, an information character stored in register 12 has two "1's" in the flip-flops of section 12*a*, it will have the value "0" stored in its flip-flop A and the value "1" stored in its flip-flop B. If, however, during the transmission of this total character two transmission errors occur in which a "0" in one of the flip-flops W, X, Y, and Z is transmitted as a "1" and the "0" in flip-flop A is also transmitted as a "1," the resulting total character stored in register 27 will have three "1's" stored in the flip-flops W, X, Y, and Z and "1's" stored in both of the flip-flops A and B. Since such a total character is compatible with the transmission of a correct character in accordance with the pattern of FIG. 1 and as more clearly shown in Table 1 of FIG. 3 this error will not be detected. However, by means of the use of an alternative embodiment in accordance with the second table shown in FIG. 3, the present invention may be adapted to detect double errors in transmission regardless of whether an error occurs in the information bits or in the check bits of a character. Detection of double errors both of which occur in the information bits will be identical to that previously discussed in connection with the pattern shown in FIG. 1. Similarly, double errors both of which occur in the check bits will be detected whether the pattern of FIG. 1 is used or that of the alternative embodiment shown in FIG. 3 since any change in the check bits will necessarily produce an error signal when no error occurs in the transmission of the information bits.

It may be seen by a study of Table 2 of FIG. 3 that a double error in transmission whereby one error occurs in the information bits and one error occurs in the check bits will be detected by this embodiment of the present invention. Thus, if the proper information character has no "1's" and the received character has one "1," a similar "0" to "1" error cannot take place in the check bits since both flip-flops A and B already store "1's." If the proper information character has one "1" stored therein and during transmission a "0" is received as a "1" and if the "0" in flip-flop B is also received as a "1," the error will be detected. Similarly, if the correct number of "1's" is two and three are received, any change from a "0" to a "1" in the check bits will also be detected as an error. If the correct information character has three "1's" and four are transmitted a similar transmission error in the check bits whereby a "0' is transmitted as a "1" will also result in the detection of this error. Similarly, it may also be shown that any "1" of the correct information characters which is transmitted as a "0" will also be detected even though a "1" in the check bits is also transmitted as a "0."

Thus, the adaptation of the present invention shown in Table 2 of FIG. 3 as an alternative embodiment will detect all double transmission errors occurring in the total character when such errors are of the type described previously, i.e., two "1's" both transmitted as "0's" or two "0's" both transmitted as "1's." Although this adaptation detects all such double transmission errors it will not detect triple transmission errors detectable by the previously described adaptation. Thus, it may be seen that the number of "1's" in each total character is not uniformly odd or even when this adaptation is utilized.

What have been described is considered to be only illustrative embodiments of the present invention, and, accordingly, it is to be understood that various and numerous other arrangements may be devised by one skilled in the art without departing from the spirit and scope of this invention.

What is claimed is:

1. An error detection system comprising:

a source of binary digital data sequentially delivering in formation characters to a first information register, each information character having $n$ bits, each $n$ bit information character being stored in its entirety in the first information register, means connected to the first information register and responsive to the contents of each information character for determining the number of binary "1's" in each information character for generating $k$ check bits manifesting this determination and for adding the $k$ check bits to each information character in the register thereby forming a total character of $n+k$ bits, $n$ being related to $k$ according to the relationship $k \geq log_2(n)$, means for transmitting the total characters to a second information registter, means connected to the second information register for determining the number of binary "1's" in each transmitted information character, and means utilizing the number of "1's" determined in the transmitted information characters and the transmitted check bits of each total character to detect errors in the transmitted information characters.

2. An error detection system comprising:

a source of binary digital data sequentially delivering information characters to a first information register, each information character having $n$ bits, means connected to the first information register and responsive to the contents of each information character for generating $k$ check bits for each character and adding the $k$ check bits to each information character in the registter thereby forming a total character of $n+k$ bits, $k$ being related to $n$ according to the relationship $k \geq \log_2(n)$, the check bits of each total character indicating the number of binary "1's" in its associated information character, means for transmitting the total characters to a second information register, means connected to the second information register for counting the number of binary "1's" in each transmitted information character, means for comparing the number of "1's" transmitted in each information character with the number indicated by the transmitted check bits, an error being indicated by a discrepancy between the number of "1's" indicated by the check bits and the number in the transmitted information character, means for storing transmitted information characters, and means for preventing the storage of those transmitted information characters for which an error is indicated by the comparing means.

3. An error detecting system according to claim 2 in which the means connected to the first information register generates $k$ check bits for each information character which not only manifest the number of "1's" in their respective information characters but also have binary values which cause all of the total characters to have the same parity.

4. An error detecting system according to claim 2 in which the means connected to the first information register generates $k$ check bits for each information character which not only manifest the number of "1's" in their respective information characters but have binary values such that all double errors created by a "1" in any information character and a "1" in its accompanying check bits both being received by the second information register as "0's" will be indicated as an error by the comparing means.

5. An error detecting system according to claim 2 in which the means connected to the first information register generates $k$ check bits for each information character which not only manifest the number of "1's" in their respective information characters but have binary values such that a "0" in the check bit values which is erroneously received as a "1" will not erroneously cause the check bits to indicate a number of "1's" one unit greater than the number of "1's" in their associated information character.

6. An error detecting system comprising:

a source of binary digital data sequentially delivering information characters having $n$ bits to a first group of $n$ flip-flop circuits, means connected to the first group of $n$ flip-flop circuits for determining the number of "1's" in each information character stored in the $n$ flip-flop circuits and for storing $k$ bits representative of this number in a first group of $k$ flip-flop circuits, $k$ being related to $n$ according to the relationship $k \geq \log_2(n)$, means for transmitting each $n$ bit character and each $k$ bit character associated therewith to second groups of $n$ and $k$ flip-flop circuits, respectively, means connected to the second group of $n$ flip-flop circuits for determining the number of "1's" in each information character stored in these flip-flop circuits, means for comparing the number of "1's" stored in the second group of $n$ flip-flop circuits with the number indicated by the $k$ bits stored in the second group of $k$ flip-flop circuits and for indicating an error upon detection of a discrepancy between the two compared numbers, means for storing transmitted information characters, and means for preventing the storage of those transmitted information characters for which an error is indicated by the comparing means.

7. An error detecting system according to claim 6 in which the means connected to the first group of $n$ flip-flop circuits stores $k$ bits in the first group of $k$ flip-flop circuits which have binary values such that the $n+k$ bits of each transmitted total character have the same parity.

8. An error detecting system according to claim 6 in which the means connected to the first group of $n$ flip-flop circuit stores $k$ bits in the first group of $k$ flip-flop circuits which have binary values such that they will not erroneously indicate a number of "1's" one unit smaller than the number of "1's" in their associated $n$ bit information character despite the erroneous reception of a "1" in the $k$ bit character as a "0" by the second group of $k$ flip-flop circuits.

9. An error detecting system comprising:

a source of binary digital data sequentially delivering information characters having four bits to a first group of four flip-flop circuits, means connected to the first group of four flip-flop circuits for determining the number of '1's" in each information character stored in the four flip-flop circuits and for storing two bits representative of this number in a first group of two flip-flop circuits, means for transmitting each four-bit character and each two-bit character associated therewith to second groups of four and two flip-flop circuits, respectively, means connected to the second group of four flip-flop circuits for determining the number of "1's" in each information character stored in these flip-flop circuits, means for comparing the number of "1's" stored in the second group of four flip-flop circuits with the number indicated by the two bits stored in the second group of two flip-flop circuits and for indicating an error upon detection of an inequality between the two compared numbers, means for storing the transmitted information characters, and means for preventing the storage of those transmitted information characters for which an error is indicated by the comparing means.

10. A method of detecting errors in the transmission of binary digital information comprising:

sequentially delivering information characters having $n$ bits to a first group of $n$ flip-flop circuits, determining the number of "1's" in each information character stored in the $n$ flip-flop circuits and storing $k$ bits representative of this number in a first group of $k$ flip-flop circuits, $k$ being related to $n$ according to the relationship $k \geq \log_2(n)$, transmitting each $n$ bit character and each $k$ bit character associated therewith to second groups of $n$ and $k$ flip-flop circuits, respectively, determining the number of "1's" in each information character stored in the second group of $n$ flip-flop circuits and comparing this number with the number indicated by the $k$ bits stored in the second group of $k$ flip-flop circuits, and storing the transmitted information character upon a determination of equally between the two compared numbers.

References Cited

UNITED STATES PATENTS

| | | | |
|---|---|---|---|
| 2,689,950 | 9/1954 | Bayliss et al. ---- | 340—146.1 X |
| 2,696,599 | 12/1954 | Holbrook et al. -- | 340—146.1 X |
| 3,144,634 | 8/1964 | Wright ----------- | 340—146.1 |
| 3,150,350 | 9/1964 | Goldman --------- | 340—146.1 |
| 2,997,540 | 8/1961 | Ertman et al. -------- | 178—23 |

MALCOLM A. MORRISON, Primary Examiner

CHARLES E. ATKINSON, Assistant Examiner

PO-1050
(5/69)

UNITED STATES PATENT OFFICE
CERTIFICATE OF CORRECTION

Patent No. 3,458,860 Dated July 29, 1969

Inventor(s) George T. Shimabukuro

It is certified that error appears in the above-identified patent and that said Letters Patent are hereby corrected as shown below:

Col. 3, line 70, after "set" insert --equal--;
Col. 4, line 11, "information" (first occurrence) should read --invention--;
Col. 5, line 52, "20b" should read --27b--;
Col. 10, line 49, "equally" should read --equality--.

SIGNED AND
SEALED

DEC 2 - 1969

(SEAL)
Attest:

Edward M. Fletcher, Jr.
Attesting Officer

WILLIAM E. SCHUYLER, JR.
Commissioner of Patents